United States Patent Office 3,408,341
Patented Oct. 29, 1968

3,408,341
CRYSTALLINITY PROMOTERS
Frederick B. Joyner and George O. Cash, Jr., Kingsport, Tenn., assignors to Eastman Kodak Company, Rochester, N.Y., a corporation of New Jersey
No Drawing. Filed Oct. 21, 1964, Ser. No. 405,586
17 Claims. (Cl. 260—94.9)

ABSTRACT OF THE DISCLOSURE

Poly-alpha-olefin compositions having an improved crystalline structure with improved physical and optical properties are obtained by employing as crystallinity promoters certain organic compounds which form a "liquid crystal" mesophase at a temperature at least below the melting point of the poly-alpha-olefinic material.

This invention relates to new poly-α-olefin compositions having improved crystalline structure resulting in greater clarity and improvements in other physical properties.

When a crystallizable polymer such as polyethylene or polypropylene cools from a melt, crystallization occurs. The rate of development of crystallinity is determined by the rate of formation of crystallization centers and the rate of growth of nuclei. The size of the crystallites depends on the rate of crystallization which depends in turn on the cooling rate and the number of nucleating particles present. Slow cooling and few nuclei favor the growth of relatively large crystallites. When light is passed through a specimen of such a polymer it becomes dispersed as it is reflected and refracted by spherulites (aggregates of crystallites) within the polymer. The polymer therefore appears white or translucent depending on the thickness of the specimen. If the polymer is quenched from the melt, rapid crystallization occurs with the formation of spherulites of such small dimensions that they do not interfere greatly with the passage of visible light. A quenched polymer, however has a low degree of crystallinity which deleteriously affects many mechanical properties. If allowed to crystallize significantly, the spherulites grow in size and the polymer looses its transparency.

In the past, the promotion of relatively rapid crystallization to achieve small spherulite size and to provide high degrees of crystallization involved the use of heterogeneous nucleating agents. For example, the crystallization rates of polyethylene and polypropylene have been increased by heterogeneous nucleating agents such as the metal salts of carboxylic and sulfonic acids. The rapid and high degree of crystallization induced by these nucleating agents generally results in improved transparency of the polymer and improved mechanical properties. Nevertheless, these nucleating agents are extremely difficult to disperse in the polymers and in many cases cause pigmentation rather than an improvement in polymer clarity.

Objects of the invention, therefore, are: to provide new poly-α-olefin compositions having a high degree of crystallinity, excellent homogeneity, greatly improved clarity and other physical properties; to provide crystallization promoters for improving the physical properties such as the transparency of crystallizable poly-α-olefins and which can readily be dispersed in poly-α-olefins to give substantially homogeneous formulations; and to provide a commercially practicable process for preparing the aforesaid new poly-α-olefin compositions.

These and other objects hereinafter appearing have been achieved in accordance with the present invention through the discovery that when crystallizable poly-α-olefins are cooled from their melts in the presence of homogeneously dispersed "liquid crystals" rather than the solid crystals of the prior art nucleating agents, the polymer crystals apparently assume a new dimension heretofore unobtainable and results in greatly improved transparency as well as other polymer properties such as stiffness, heat distortion resistance, and the like. Also, in many instances the resistance to oxidation and weathering is improved as is the anti-static character of the polymers. This new concept of thus employing liquid crystals is a remarkable innovation in the polymer art and when considered in respect to the prior art nucleating phenomenon of expitaxy engenders a certain amount of wonderment.

The "liquid crystals" of the present invention exists as a phase of those compounds which exhibit thermotropic mesomorphism which is defined in the text "Molecular Structure and the Properties of Liquid Crystals" by G. W. Gray, 1962, Academic Press, New York, N.Y. A critical property of the present crystallization promoting materials is that they must be compatible with the polymers at relatively high concentrations. This feature alone represents a considerable advance over prior art technology.

These materials which exhibit thermotropic mesomorphism can be readily dispersed in the polyolefin by means of conventional techniques to give substantially homogeneous blends and can be used in high concentrations (10% or more) without pigmentation. In addition, the new crystallization promoters of this invention, as aforesaid, are much more effective than the prior art heterogeneous nucleating agents in providing polyolefins with improved mechanical properties and transparency.

Among the useful compounds which have a liquid crystalline state are: N-substituted ammonium salts of aromatic sulfonic acids exemplified by— dibutylammonium benzenesulfonate,
trimethylammonium p-tert-butyl-benzenesulfonate,
methylphenylammonium benzenesulfonate,
pyridinium benzenesulfonate,
cyclohexylammonium p-toluenesulfonate,
dihexylammonium 1-naphthalenesulfonate,
dibutylammonium p-tert-butyl-benzenesulfonate,
piperidinium benzenesulfonate,
diethylammonium p-dodecylbenzenesulfonate,
diamylammonium o-toluenesulfonate,
dibutylammonium 2-naphthalenesulfonate,
butylammonium p-tert-octylbenzenesulfonate,
octylammonium benzenesulfonate,
didecylammonium 1-naphthalenesulfonate,
α-methylbenzylammonium benzenesulfonate,
tert-butylammonium p-tert-butyl-benzenesulfonate,
isobutylammonium p-tert-butyl-benzenesulfonate,
triethylammonium benzenesulfonate,
dibutylammonium 4-phenylbenzenesulfonate,
dioctylammonium anthracene-1-sulfonate,
morpholinium 2,4-xylenesulfonate,
thiomorpholinium 2,5-xylenesulfonate,
piperazinium 2-p-crymenesulfonate 2,4-diethylpyridinium 2-mesitylenesulfonate,
2-butylpyridinium 3-durensulfonate,
2-methylpyridinium p-butylbenzenesulfonate,
4-methylpyridinium p-ethylbenzenesulfonate,
2,4,6-trimethylpyridinium benzenesulfonate,
2-methyl-4-ethylpyridinium 4-isodurenesulfonate,
4-methyl-3-ethylpyridinium p-decylbenzenesulfonate,
N-methylanilinium 2,4,5-tri-isopropylbenzenesulfonate,
N-propylanilinium 2-p-cymenesulfonate,
ethylbenzylammonium p-dodecylbenzenesulfonate,
4-isopropylpyridinium 5-prehnitenesulfonate,
2,4-dimethylanilinium p-isopropylbenzenesulfonate,
4-ethylanilinium benzenesulfonate, N,N-dimethylanilinium 2,4-xylene sulfonate,
cyclopropylammonium benzenesulfonate,
cyclopropylcarbinylammonium benzenesulfonate.

N-substituted ammonium salts of aromatic carboxylic acids exemplified by— piperidinium p-tert-butylbenzoate,
dibutylammonium p-tert-butylbenzoate,
tributylammonium p-tert-butylbenzoate,
dibutylammonium p-toluate,
piperidinium p-isopropylbenzoate,
piperidinium benzoate,
diamylammonium o-toluate,
methylbenzylammonium p-ethylbenzoate,
dimethylammonium p-tert-octylbenzoate,
dihexylammonium 1-naphthoate,
didecylammonium p-phenylbenzoate,
pyridinium p-tert-butylbenzoate, diethylammonium p-dodecylbenzoate,
cyclohexylammonium m-toluate,
octylammonium 2-naphthoate,
isobutylammonium p-isopropylbenzoate,
tert-butylammonium p-tert-butylbenzoate,
dibutylammonium anthracene-1-carboxylate,
dibutylammonium 1-naphthoate,
piperidinium p-isobutylbenzoate.

The N-substituted ammonium half-salts of dibasic aliphatic acids exemplified by the half-salts of dibasic acids such as— piperidinium glutarate,
dibutylammonium succinate,
tributyl-ammonium fumarate,
dibutylammonium adipate,
piperidinium pimelate,
piperidinium suberate,
diamylammonium maleate,
methylbenzylammonium sebacate,
dimethylammonium azelate,
dihexylammonium α,α-dimethylsuccinate,
didecylammonium mesaconate,
pyridinium succinate,
diethylammonium glutaconate,
cyclohexylammonium methylsuccinate,
octylammonium maleate,
isobutylammonium pimelate,
tert-butylammonium α-methyladipate,
dibutylammonium glutarate,
dibutylammonium sebacate,
piperidinium muconate.

The amide complexes of organic carboxylic acids exemplified by the complexes of— hexamethylphosphoric triamide+p-tert-butylbenzoic acid,
hexaethylphosphoric triamide+p-isopropylbenzoic acid,
hexabutylphosphoric triamide+p-toluic acid,
hexalaurylphosphoric triamide+m-toluic acid,
tripiperidino-phosphine oxide+p-t-butylbenzoic acid,
O,O-diethyl-N,N-dibutylphosphoramidate+p-toluic acid,
O-butyl-N,N,N',N'-tetralaurylphosphorodiamidate+o-toluic acid,
O,O-diethyl-N,N-dihexylphosphoramidite+2-naphthoic acid,
O-butyl-N,N,N',N'-tetraoctylphosphorodiamidate+1-naphthoic acid,
hexabutylphosphorous triamide+p-isopropylbenzoic acid,
N,N-dimethylformamide+p-t-butylbenzoic acid,
N,N-dimethylacetamide+p-n-butylbenzoic acid,
N-cyclohexylacetamide+m-toluic acid,
N-t-butylbenzamide +p-t-butylbenzoic acid,
N-methyl-N-phenylacetamide+p-isopropylbenzoic acid,
N-benzylacetamide+p-isobutylbenzoic acid,
n-heptamide+1-naphthoic acid,
palmitamide+p-isopropylbenzoic acid,
stearanilide+p-dodecylbenzoic acid,
N,N'-di-t-butylurea+p-t-butylbenzoic acid,
N,N'-dimethyl urea+p-toluic acid,
tetramethylurea+o-toluic acid,
N,N,N',N'-tetramethyladipamide+benzoic acid,
N-methylisobutyramide+p-isopropylbenzoic acid,
N-benzoylmorpholine+p-t-butylbenzoic acid,
N,N'-diacetylpiperazine+p-n-butylbenzoic acid,
ethyl-N-butylcarbamate+p-t-butylbenzoic acid,
N,N,N',N'-tetramethylphenylphosphonic diamide+p-tert-butylbenzoic acid,
N,N,N',N'-tetraethylchloromethylphosphoric diamide+p-tert-butylbenzoic acid,
N,N-dibutyldiphenylphosphinic amide+p-isopropylbenzoic acid,
p-n-alkoxybenzoic acid and its non-metallic salts,
trans-p-n-alkoxycinnamic acid and its non-metallic salts,
6-n-alkoxy-2-naphthoic acids,
4,4'-dialkoxystilbene,
4'-n-alkoxy-3'-bromobiphenyl-4-carboxylic acid,
n-alkoxybiphenyl-4-carboxylic acid,
2,4-nonadienoic acid, and
2,4-undecadienoic acid.

As indicated by the great number of exemplary compounds disclosed herein, the application of such compatible thermotropic mesomorphs to the present invention is universal. It is particularly noted, however, that for one or more of a variety of reasons the preferred ones of such compounds are the amine salts of the substituted benzoic acids. These compounds may be denoted by the formula $[R—COO]^-[\text{Amine·H}]^+$ wherein R is an alkyl substituted phenyl radical and $[\text{Amine·H}]^+$ is derived from an amine selected from the group consisting of

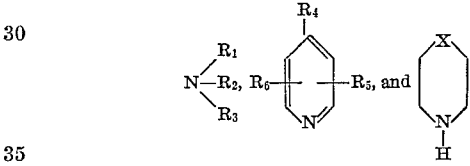

wherein at least one of $R_1$, $R_2$, and $R_3$ is selected from the group consising of aliphatic, hydrocarbon radicals of from 1 to 20 carbon atoms, alicyclic hydrocarbon radicals of from 5 to 6 ring carbon atoms, and aromatic hydrocarbon radicals, wherein $R_4$, $R_5$, and $R_6$ are selected from the group consisting of hydrogen and aliphatic hydrocarbon radicals of from 1 to 4 carbon atoms, and X is selected from the group consisting of —$CH_2$—, —NH—, —O— and —S—. Representative R radicals include those derived from 2,4-xylene; 2,5-xylene; cymene; mesitylene; durene; butylbenzene; ethylbenzene; dodecylbenzene; and prehnitene.

The crystallization promoters of this invention are especially useful for improving the properties of polypropylene and the crystallizable copolymers of propylene with ethylene and with other α-olefins. In general, however, crystallizable polymers and copolymers of α-olefins containing from 2 to 10 carbon atoms can be used. Some examples are: polyethylene, polypropylene, ethylene/propylene block copolymers, poly(butene-1), propylene/butene-1 copolymers, propylene/hexene-1 copolymers, propylene/decene-1 copolymers, and poly-4-methylpentene-1. In general, the N-substituted ammonium aromatic sulfonates are used in concentrations of from about 0.05 to about 5.0 percent, with lower and higher concentrations being operable. The preferred concentration range is from about 0.1 to about 2.0 percent. The N-substituted ammonium salts of the aromatic and aliphatic carboxylic acids are used in concentrations of from about 0.05 to about 10.0 percent, although both lower and higher concentrations are operable. The preferred concentration range is from about 0.1 to about 5.0 percent. In general, the amide complexes of aromatic carboxylic acids are useful in concentrations of from about 0.05 to about 20.0% by weight, although both lower and higher concentrations are operable. The preferred concentration is from about 0.1 to about 5.0%. These amide complexes can be prepared by reacting the acids with the desired amides or phosphoramides in a weight ratio of from about 10:1 to about 1:10.

The α-olefin polymers useful in the practice of this invention may have practically any desired molecular weight ranging from materials having inherent viscosities (in tetralin at 145° C.) of 5.0 and above to 0.1 and below. Completely random α-olefin copolymers and atactic homopolymers which do not crystallize are not operable in the present invention. The useful, crystallizable poly-α-olefins may conveniently be prepared by bulk, solution or suspension polymerizations employing any well known catalyst such as the stereospecific organometallic type which produces a stereoregular type of polymer. For the polymerizations of propylene and higher homologs, a number of useful solid, stereospecific polymerization catalysts are known in the art. They generally contain at least 2 components, namely a transition element compound and an activator therefor. Such catalysts include, for example, mixtures containing a compound of a transition element from the 4th to the 6th sub-groups of the Periodic Table in combination with a metal of Group I–A or Group II or aluminum, or an alloy of metals of Group I–A and/or II and/or aluminum, or a halide or organametallic compound of a metal of Group I–A or II and/or aluminum or a complex hydride or a complex organametallic compound of boron or aluminum and a metal of Group I–A or II of the Periodic Table. The Periodic Table referred to herein can be found in "Langes Handbook of Chemistry," 8th ed., (1952), published by Handbook Publishers, Inc., at pp. 56 and 57, for example.

The transition metals included in Groups IV–B through VI–B of the Periodic Table are exemplified by metals such as titanium, zirconium, vanadium, molybdenum, chromium, tungsten and the like. The transition metal can be at its maximum valance but compounds of a transition metal of reduced valance are often used. Among the transition metal compounds that are used are halides, alkoxy halides and acetylacetonates of the aforementioned transition metals. Such compounds as titanium tetrachloride, titanium trichloride, dibutoxy titanium dichloride, diethoxy titanium dichloride, and titanium acetylacetonate have been used in such catalyst combinations. Similar compounds of zirconium, vanadium, chromium, molybdenum are also used. The halides of titanium, either at its maximum valancy or at a reduced valancy, have been most generally employed.

Suitable second components or activators which are often employed in combination with the transition element compounds include, for example, metal alkyls, metal alkyls, metal alkyl halides and metal hydrides of aluminum or Group I–A and II metals as well as the metals alone. Examples of such materials include sodium, potassium, lithium, zinc, sodium amyl, potassium butyl, lithium propyl, zinc dibutyl, zinc diamyl, zinc dipropyl, ethyl magnesium bromide, sodium hydride, calcium hydride, lithium aluminum hydride, aluminum triethyl, aluminum tributyl, ethyl aluminum dichloride, cyclohexyl aluminum dichloride, cyclobutyl aluminum dichloride, ethyl aluminum dibromide, ethyl aluminum sesquibromide, propyl aluminum dichloride, dibutyl aluminum chloride, diethyl aluminum chloride, and the like.

In order to increase stereospecificity and to reduce the formation of oils and amorphous polymer, a number of third components have been employed. Suitable third components include, for example, halides of alkali metals such as sodium fluoride, aromatic ethers such as diphenyl ether, hydrides of sodium, potassium and lithium, alcoholates or oxides of sodium, potassium, lithium, calcium, magnesium, barium, strontium, aluminum, titanium or zirconium, tertiary phosphoramides and the like.

A very effective class of third components are those having the formulas P(O)Y$_3$, PY$_3$ RC(O)Y and

where each Y represents a lower alkylamino or lower alkoxy radical, R is an alkyl radical, desirably containing 1 to 8 carbon atoms and $n$ is an integer of 1 to 4. Among the specific compounds that are used are tris-N,N-dimethyl phosphoramide, triethyl phosphate, mixed phosphate ester-amides, triethyl phosphite, N,N-dimethylacetamide, adipamide, and the like.

Generally, a mole ratio of activator to transition element compound of 0.1:1 to about 12:1 is employed in a solid, stereospecific polymerization catalyst. Mole ratios of transition element compound to third components are generally in the range of about 0.25:0 to about 1:1. The concentration of the catalyst in the reaction medium is usually varied over a wide range. For example, catalyst concentrations of about .05% or less, up to about 3% or more, based on monomer feed, are generally used.

Among the improvements made in poly (α-olefins) are:

(1) Increased clarity of molded objects;
(2) Improved dimensional stability;
(3) More rapid setting up in molds thus giving shorter molding cycles;
(4) Decreased post-mold warpage of molded objects;
(5) Increased stiffness, hardness, tensile yield strength (crystallinity-dependent properties);
(6) Better impact strength;
(7) Decreased residual tack in copolymers,
(8) Decreased period of initial tack in copolymers;
(9) Improved weatherability and oxidation resistance; and
(10) Improved anti-static properties.

The following specific results of the use of the present crystallization promoters illustrate the applications of the invention:

(1) High-density polyethylene having reduced post-mold warpage and better dimensional stability;
(2) Polypropylene having improved clarity, higher stiffness and higher heat distortion temperature;
(3) Poly(1-butene) having greater stiffness and hardness;
(4) Propylene/1-butene copolymers with greater rigidity and reduced tack;
(5) Low-viscosity propylene/1-butene copolymers having a reduced delayed tack time and giving less permeable coatings;
(6) Poly(4-methyl-1-pentene) fibers having improved high-temperature properties;
(7) Polyolefins, in general, having improved moldability (surface finish, uniform mold shrinkage, shorter mold cycle, better mold release) and processability (e.g., chill-roll release); and
(8) Propylene/1-butene copolymer film having improved modulus.

In the following examples, the various polyolefins contained as stabilizers 0.1% concentration of dilauryl 3,3'-thiodipropionate and 0.1% 4,4'-butylidenebis(6-tert-butyl-m-cresol). In these examples, the natural blocking test was run at approximately 23° C. and gives the force in grams required to pull apart two pieces of approximately 1 mil thick film, four square inches of which have been pressed together under a 5 kilogram load. The pull is exerted at 2 in./min. by an Instron Tensile Tester, Model TM, of the Instron Engineering Corporation. In this test, the film pieces are secured at their edge portions to respective top and bottom, 4 inch square platens secured respectively to the upper and lower clamps of the Instron machine.

The percent elongation was also determined at about 23° C. on the said Instron machine from 5 inch long, single filament samples pulled at a crosshead speed of 5 inches per minute until the filament broke. The percent elongation is the percent increase in length at the moment of break. The tenacity or tensile strength was determined in the same manner and along with the percent elongation, and represents the pulling load in g./denier at break. The elastic modulus, which is also a by-product of the percent elongation determination represents the slope of the straight line portion of the curve obtained on the Instron Recorder chart. This slope signifies the stress required to actually deform (begin the elongation of) the sample filament.

Example 1

Polypropylene (100 g.) having an inherent viscosity measured in tetralin at 145° C. of 1.8 and a conditioned density of 0.909 was blended in a Banbury mixer with 1.0 gram of dibutylammonium p-tert-butylbenzoate. A sample of the resulting homogeneous blend was compression molded into a sheet having a thickness of 60 mils. The transparency of the sheet was measured with a Brice-Phoenix photometer (resolution of 10 minutes). The measure of transparency was taken as the ratio of light transmitted at zero degrees with reference to the incident beam (monochromatic light at 546 m$\mu$) to that transmitted at one degree, higher values of the intensity ratio indicating better transparency. In addition, a sample of the above blend was injection molded for physical property determinations. The following table shows the outstanding clarity and physical properties possessed by the treated polypropylene (I) in comparison with a similar sample of untreated polypropylene (II) and a sample treated with a 1% concentration of sodium p-tert-butylbenzoate (III).

| Property | Units | Test Method | Polymer | | |
|---|---|---|---|---|---|
| | | | I | II | III |
| Transparency | | $I_0°/I_1°$ | 14.0 | 1.09 | 2.10 |
| Crystallization temp | °C | DTA | 140 | 124 | 145 |
| Heat distortion, temp | °C | | 162 | 154 | 158 |
| Tensile yield | P.s.i. | ASTM-D638 | 6,500 | 5,500 | 5,800 |
| Stiffness | P.s.i. | ASTM-D747 | 202,000 | 165,000 | 175,000 |
| Hardness, Rockwell R-scale | | ASTM-D785 | 101 | 99 | 99 |
| Izod impact, notched, 23° C | Ft.-lb./in. of notch | ASTM-256 | 0.8 | 0.7 | 0.6 |

Results similar to those in column I were obtained when a 5% concentration of dubutylammonium 1-naphthoate or methylphenylammonium p-toluate was used in place of the dibutylammonium p-tert-butylbenzoate. All attempts to prepare a completely homogeneous blend of polypropylene with the prior art sodium p-tert-butylbenzoate were unsuccessful, particles of the nucleating agent usually being visible to the eye and readily observable by a microscope or by X-ray. The crystallization promoters of this invention give homogeneous blends and are not detectable by X-rays when dispersed in the polymer.

Example 2

A 200-g. sample of conventional high-pressure polyethylene having a density of 0.916 was blended in a Banbury mixer with 1 g. of piperidinium p-tert-butylbenzoate. The resulting polyethylene was extruded at 360° F. into tubular film (0.9–1.1 mil) having improved transparency and a reduced tendency toward blocking as shown in the table below:

| Property | Units | Test Method | Polymer | |
|---|---|---|---|---|
| | | | Treated | Untreated |
| Density | G./ml. | ASTM-D1505 | 0.921 | 0.916 |
| Natural blocking, 23° C | Grams | | 20 | 39 |
| Haze | Percent | ASTM-D1003 | 4 | 11 |
| Gloss 45° (ASTM-D523) | Do. | | 80 | 55 |

Similar results were obtained when piperidinium p-isopropylbenzoate or dihexylammonium 1-naphthoate was used in place of the piperidinium p-tert-butylbenzoate.

Example 3

A 5000-g. sample of high-density (0.961) polyethylene having a melt index of 4 was blended in a Banbury mixer with 20 g. of diamylammonium o-toluate and then re-extruded into 1/8-in. pellets. The pellets were then injection molded into 4-in. flat discs. Similar discs were molded from the original high-density polyethylene which had been processed in the Banbury mixer and extruded, but without the diamylammonium o-toluate. The discs were allowed to age for 48 hours and were then checked for warpage. Only 10% of the discs from the treated polyethylene were found to be warped compared to 80% for the untreated polyethylene. Similar results were obtained when tributylammonium p-tert-butylbenzoate or dimethylammonium p-tert-octylbenzoate was used in place of the diamylammonium o-toluate. Potassium and lithium o-toluates or p-tert-butylbenzoates when blended into the high-density polyethylene gave relatively poor dispersions and were relatively ineffective.

Example 4

A 1000-g. sample of isotactic polybutene-1 having a melt index of 2.3 (190° C.; 2.16 kg.) and a melting point of 122° C. (by DTA) was blended in a Banbury mixer with 20 g. of piperidinium p-isobutylbenzoate. The resulting blend was cooled, granulated, and injection molded into specimens for physical properties tests. The results given in the table below show the great improvement in physical properties obtained in comparison with poly(butene-1) containing no crystallization promoter.

| Property | Units | Test Method | Poly(butene-1) | |
|---|---|---|---|---|
| | | | Treated | Untreated |
| Hardness, Shore D | | D Durometer | 70 | 63 |
| Tensile yield strength | P.s.i. | ASTM-D638 | 10,960 | 9,900 |
| Stiffness | P.s.i. | ASTM-D747 | 144,000 | 107,000 |
| Heat distortion temp | °C | | 128 | 120 |

Comparable results are obtained when the piperidinium p-isobutylbenzoate is replaced with either pyridinium p-tert-butylbenzoate or cyclohexylammonium m-toluate.

Example 5

A 2-period block copolymer comprised of stereoregular sequences of propylene units (80 wt. percent) and 1-butene units (20 wt. percent) was prepared by conventional techniques in which living stereoregular propylene polymer chains were prepared followed by removal of unreacted propylene, then the introduction of 1-butene and continued polymerization. The block polymer (500 g.) was blended in a Banbury mixer with dibutylammonium p-toluate (0.5 g.) and then granulated. A sample of the treated block polymer was compression molded into a small (1.5 in.) disk having a thickness of 60 mils. The transparency ($I_0°/I_1°$) of the disc was 5.25 compared with a control value of 1.12 for the untreated block polymer. Similar results are obtained when a 0.25% concentration of either piperidinium benzoate or dibutylammonium anthracene-1-carboxylate is used in place of the dibutylammonium p-toluate above.

Example 6

A low-viscosity costereosymmetric copolymer comprising 55 wt. percent propylene and 45 wt. percent 1-butene and having an inherent viscosity of 0.35 was melt blended with isobutylammonium p-isopropylbenzoate to provide a 0.05% concentration of the latter. Films of both the treated and untreated low-viscosity copolymers were melt cast at 190° C. using a hot doctor blade followed by quenching in cold water. The treated film showed a delayed tack period of 15 seconds compared to a delayed tack period of 45 seconds for the untreated film. The treated low-viscosity copolymer was thus useful for curtain coating applications, while the long delayed tack of the untreated polymer was objectionable since coated objects tended to stick together in assembly line operations. Comparable results were obtained when octylammonium 2-naphthoate or tert-butylammonium p-tert-butylbenzoate was used in place of the isobutylammonium p-isopropylbenzoate above. Similar results were observed, also, when the above salts were added to a 65/35 propylene/hexene-1 copolymer or to a 70/30 propylene/decene-1 copolymer.

Example 7

A 2-kg. sample of poly-4-methyl-1-pentene powder having a melting point of 240° C. (by differential thermal analysis) and an inherent viscosity of 1.5 in tetralin at 145° C. is dry blended with 20 g. of methylbenzylammonium p-ethylbenzoate. The resulting blend is melt extruded into a 1/16-in. rod and chopped into pellets about 3/16 in. long. These pellets are fed to an extruder equipped with a single-hole jet and are melt spun into a continuous monofilament having substantially no spin draft. The monofilament is quenched in ice water during spinning and is subsequently drafted 12 to 1 over a hot roll at 115° C. The properties of this monofilament (I) at 80° C. are shown in the table given below and are compared with a similar poly-4-methylpentene-1 monofilament containing no methylbenzylammonium p-ethylbenzoate (II).

| Property | I | II |
|---|---|---|
| Denier | 24 | 20 |
| Tenacity, g./den | 1.98 | 0.7 |
| Elongation, percent | 43 | 57 |
| Elastic modulus, g./den | 18 | 7 |

Comparable results are obtained when either didecylammonium p-phenylbenzoate or diethylammonium p-dodecylbenzoate is used in place of the methylbenzylammonium p-ethylbenzoate above.

Example 8

The procedure of Example 1 was followed except that a 2-period block copolymer of ethylene (15 wt. percent) and propylene (85 wt. percent) was used in place of the polypropylene. The transparency ($I_0°/I_1°$) of the block copolymer was increased from a value of 1.06 to 10.5 by the addition of the dibutylammonium p-tert-butylbenzoate.

Example 9

Polypropylene (100 g.) having an inherent viscosity measured in tetralin at 145° C. of 1.8 and a conditioned density of 0.909 was blended in a Banbury mixer with 1.0 gram of dibutylammonium benzenesulfonate. A sample of the resulting homogeneous blend was compression molded into a sheet having a thickness of 60 mils. The transparency of the sheet was measured with a Brice-Phoenix photometer (resolution of 10 minutes). The measure of transparency was taken as the ratio of light transmitted at zero degrees with reference to the incident beam (monochromatic light at 546 mμ) to that transmitted at one degree, higher values of the intensity ratio indicating better transparency. In addition, a sample of the above blend was injection molded for physical properties determinations. The following table shows the outstanding clarity and physical properties possessed by the treated polypropylene (I) in comparison with a similar sample of untreated polypropylene (II) and a sample treated with a 1% concentration of sodium benzenesulfonate (III).

| Property | Units | Test Method | Polymer | | |
|---|---|---|---|---|---|
| | | | I | II | III |
| Transparency | | $I_0°/I_1°$ | 3.66 | 1.09 | 1.59 |
| Crystallization temp | °C | DTA | 140 | 124 | 147 |
| Heat distortion temp | °C | | 162 | 154 | 157 |
| Tensile yield | P.s.i | ASTM-D638 | 6,300 | 5,500 | 5,600 |
| Stiffness | P.s.i | ASTM-D747 | 180,000 | 165,000 | 172,000 |
| Hardness, Rockwell R-scale | | ASTM-D785 | 99 | 89 | 95 |
| Izod impact notched, 23° C | ft.-lb./in. of notch | ASTM-D256 | 0.8 | 0.7 | 0.6 |

Results similar to those in column I were obtained when dibutylammonium 2-naphthalenesulfonate or methylphenylammonium benzenesulfonate was used in place of the dibutylammonium benzenesulfonate. All attempts to prepare a completely homogeneous blend of polypropylene with the prior art sodium benzenesulfonate were unsuccessful. Particles of the nucleating agent were usually visible to the eye, and could readily be seen with the microscope and detected by X-rays. The present crystallization promoters gave homogeneous blends and were not detectable by X-rays when dispersed in the polymer.

Example 10

A 200-gram sample of conventional high-pressure polyethylene having a density of 0.916 was blended in a Banbury mixer with 1 gram of dibutylammonium p-tert-butylbenzenesulfonate. The resulting polyethylene was extruded at 360° F. into tubular film (0.9–1.1 mil) having improved transparency and a reduced tendency toward blocking as shown in the table below:

| Property | Units | Test Method | Polymer | |
|---|---|---|---|---|
| | | | Treated | Untreated |
| Density | G./ml | ASTM-D1505 | 0.920 | 0.917 |
| Natural blocking, 23° C | Grams | | 33 | 39 |
| Haze | Percent | ASTM-D1003 | 4 | 11 |
| Gloss at 45° | Do | | 70 | 55 |

Similar results were obtained when piperidinium benzenesulfonate or dihexylammonium 1-naphthalenesulfonate was used in place of the dibutylammonium p-tert-butylbenzenesulfonate.

Example 11

A 5000-gram sample of high-density (0.961) polyethylene having a melt index of 4 was blended in a Banbury mixer with 20 grams of diamylammonium benzenesulfonate and then re-extruded into ⅛-in. pellets. The pellets were then injection molded into 4-in. flat discs. Similar discs were molded from the original high-density polyethylene which had been processed in the Banbury mixer and extruded, but without the diamylammonium benzenesulfonate. The discs were allowed to age for 48 hours and were then checked for warpage. Only 20% of the discs from the treated polyethylene were found to be warped compared to 80% for the untreated polyethylene. Similar results were obtained when trimethylammonium p-tert-butylbenzenesulfonate or diamylammonium o-toluenesulfonate was used in place of the diamylammonium benzenesulfonate. Potassium and lithium benzenesulfonates when blended into the high-density polyethylene gave relatively poor dispersions and were substantially ineffective.

Example 12

A 1000-gram sample of isotactic polybutene-1 having a melt index of 2.3 (190° C.; 2.16 kg.) and a melting point of 122° C. (by DTA) was blended in a Banbury mixer with 20 grams of dihexylammonium 1-naphthalenesulfonate. The resulting blend was cooled, granulated, and injection molded into specimens for physical properties tests. The results given in the table below show the great improvement in physical properties obtained in comparison with polybutene-1 containing no crystallization promoter.

| Property | Units | Test Method | Poly(butene-1) Treated | Poly(butene-1) Untreated |
| --- | --- | --- | --- | --- |
| Hardness, Shore D | | D Durometer | 70 | 63 |
| Tensile yield strength | P.s.i | ASTM-D638 | 11,600 | 9,900 |
| Stiffness | P.s.i | ASTM-D747 | 141,000 | 107,000 |
| Heat distortion temp | ° C | | 128 | 120 |

Example 13

A two-period block copolymer comprised of stereoregular sequences of propylene units (80 wt. percent) and butene-1 units (20 wt. percent) was prepared by conventional techniques in which living stereoregular propylene polymer chains were prepared, followed by removal of unreacted propylene, then the introduction of 1-butene and continued polymerization. The block polymer (500 g.) was blended in a Banbury mixer with triethylammonium benzenesulfonate (0.5 g.) and then granulated. A sample of the treated block polymer was compression molded into a small (1.5 in.) disk having a thickness of 60 mils. The transparency ($I_0°/I_1°$) of the disc was 3.17 compared with a control value of 1.12 for the untreated block polymer. Similar results were obtained when a 0.25 percent concentration of diamylammonium o-toluenesulfonate was used in place of the triethylammonium benzenesulfonate above.

Example 14

A low-viscosity costereosymmetric copolymer comprising 55 wt. percent propylene and 45 wt. percent 1-butene and having an inherent viscosity of 0.35 was melt blended with pyridinium benzenesulfonate to provide a 0.05 percent concentration of the latter. Films of both the treated and untreated low-viscosity copolymers were melt cast at 190° C. using a hot doctor blade followed by quenching in cold water. The treated film showed a delayed tack period of 20 seconds compared to a delayed tack period of 45 seconds for the untreated film. The treated low-viscosity copolymer was thus useful for curtain coating applications, while the long delayed tack of the untreated polymer was objectionable, since coated objects would tend to stick together in assembly line operations. Comparable results are obtained when cyclohexylammonium p-toluenesulfonate or octylammonium benzenesulfonate was used in place of the pyridinium benzenesulfonate above. Similar results are observed, also, when the above salts are added to a 65/35 propylene/hexene-1 copolymer or to a 70/30 propylene/decene-1 copolymer.

Example 15

A two-kg. sample of poly-4-methyl-1-pentene powder having a melting point of 240° C. (by differential thermal analysis) and an inherent viscosity of 1.5 in tetralin at 145° C. was dry blended with 20 g. of methyl-benzylammonium benzenesulfonate. The resulting blend was melt extruded into a ¾₆-in. rod and chopped into pellets about ³⁄₁₆-in. long. These pellets were fed to an extruder equipped with a single-hole jet and were melt spun into a continuous, 20-denier monofilament having substantially no spin draft. The monofilament was quenched in ice water during spinning and was subsequently drafted 12 to 1 over a hot roll at 115° C. The properties of this monofilament (I) at 80° C. are shown in the table given below and are compared with a similar monofilament prepared from poly-4-methyl-pentene-1 containing no methylbenzylammonium benzenesulfonate (II).

| Property | I | II |
| --- | --- | --- |
| Denier | 21 | 20 |
| Tenacity, g./den | 1.73 | 0.7 |
| Elongation, percent | 48 | 57 |
| Elastic modulus, g./den | 13 | 7 |

Example 16

Polypropylene (100 g.) having an inherent viscosity measured in tetralin at 145° C. of 1.8 and a conditioned density of 0.909 was blended in a Banbury mixer with 1.0 gram of dibutylammonium succinate. A sample of the resulting homogeneous blend was compression molded into a sheet having a thickness of 60 mils. The transparency of the sheet was measured with a Brice-Phoenix photometer (resolution of 10 minutes). The measure of transparency was taken as the ratio of light transmitted at zero degrees with reference to the incident beam (monochromatic light at 546 mμ) to that transmitted at one degree, higher values of the intensity ratio indicaing better transparency. In addition, a sample of the above blend was injection molded for physical property determinations. The following table shows the outstanding clarity and physical properties possessed by the treated polypropylene (I) in comparison with a similar sample of untreated polypropylene (II) and a sample treated with a 1 percent concentration of aluminum succinate.

| Property | Units | Test Method | Polymer I | Polymer II | Polymer III |
| --- | --- | --- | --- | --- | --- |
| Transparency | | $I_0°/I_1°$ | 3.90 | 1.09 | 1.85 |
| Crystallization temp | ° C | DTA | 142 | 124 | 136 |
| Heat distortion temp | ° C | | 160 | 154 | 154 |
| Tensile yield | P.s.i | ASTM-D638 | 6,300 | 5,500 | 5,600 |
| Stiffness | P.s.i | ASTM-D747 | 200,000 | 165,000 | 170,000 |
| Hardness, Rockwell R-scale | | ASTM-D785 | 101 | 99 | 99 |
| Izod impact, notched, 23° C | ft. lb./in. of notch | ASTM-256 | 0.8 | 0.7 | 0.5 |

Results similar to those in column I were obtained when a 5% concentration of dibutylammonium sebacate or methylphenylammonium glutaconate was used in place of the dibutylammonium succinate. All attempts to prepare a completely homogenous blend of polypropylene with the prior art aluminum succinate were unsuccessful, particles of the nucleating agent being usually visible to the eye, and readily observable by a microscope or by X-ray. The crystallization promoters of this invention give homogenous blends and are not detectable by X-rays when dispersed in the polymer.

Example 17

A 200-g. sample of conventional high-pressure polyethylene having a density of 0.916 was blended in a Banbury mixer with 1 g. of piperidinium glutarate. The resulting polyethylene was extruded at 360° F. into tubular film (0.9–1.1 mil) having improved transparency and a reduced tendency toward blocking as shown in the table below:

| Property | Units | Test Method | Polymer Treated | Polymer Untreated |
|---|---|---|---|---|
| Density | G./ml. | ASTM-D1505 | 0.920 | 0.916 |
| Natural blocking, 23° C. | Grams | | 18 | 39 |
| Haze | Percent | ASTM-D1003 | 5 | 11 |
| Gloss at 45° | Percent | | 77 | 55 |

Similar results were obtained when piperidinium pimelate or dihexylammonium α,α-dimethylsuccinate was used in place of the piperidinium glutarate.

Example 18

A 5000-g. sample of high-density (0.961) polyethylene having a melt index of 4 was blended in a Banbury mixer with 20 g. of diamylammonium maleate and then re-extruded into ⅛-in. pellets. The pellets were then injection molded into 4-in. flat discs. Similar discs were molded from the original high-density polyethylene which had been processed in the Banbury mixer and extruded, but without the diamylammonium maleate. The discs were allowed to age for 48 hours and were then checked for warpage. Only 25% of the discs from the treated polyethylene were found to be warped compared to 80% for the untreated polyethylene. Similar results were obtained when tributylammonium fumarate or dimethylammonium azelate was used in place of the diamylammonium maleate. Potassium and lithium maleates or azelates when blended into the high-density polyethylene gave relatively poor dispersions and were relatively ineffective.

Example 19

A 1000-g. sample of isotactic polybutene-1 having a melt index of 2.3 (190° C.; 2.16 kg.) and a melting point of 122° C. (by DTA) was blended in a Banbury mixer with 20 g. piperidinium suberate. The resulting blend was cooled, granulated, and injection molded into specimens for physical properties tests. The results given in the table below show the great improvement in physical properties obtained in comparison with poly(butene-1) containing no crystallization promoter.

Example 20

A 2-period block copolymer comprised of stereoregular sequences of propylene units (80 wt. percent) and 1-butene units (20 wt. percent) was prepared by conventional techniques in which living stereoregular propylene polymer chains were prepared followed by removal of unreacted propylene, then the introduction of 1-butene and continued polymerization. The block polymer (500 g.) was blended in a Banbury mixer with dibutylammonium adipate (0.5 g.) and then granulated. A sample of the treated block polymer was compression molded into a small (1.5 in.) disk having a thickness of 60 mils. The transparency ($I_0°/I_1°$) of the disc was 3.20 compared with a control value of 1.12 for the untreated block polymer. Similar results are obtained when a 0.25% concentration of either piperidinium muconate or dibutylammonium glutarate is used in place of the dibutylammonium adipate above.

Example 21

A low-viscosity costereosymmetric copolymer comprising 55 wt. percent propylene and 45 wt. percent 1-butene and having an inherent viscosity of 0.35 was melt blended with isobutylammonium pimelate to provide a 0.05% concentration of the latter. Films of both the treated and untreated low-viscosity copolymers were melt cast at 190° C. using hot doctor blade followed by quenching in cold water. The treated film showed a delayed tack period of 15 seconds compared to a delayed tack period of 45 seconds for the untreated film. The treated low-viscosity copolymer was thus useful for curtain coating applications, while the long delayed tack of the untreated polymer was objectionable since coated objects tended to stick together in assembly line operations. Comparable results were obtained when octylammonium maleate or tert-butylammonium α-methyladipate was used in place of the isobutylammonium pimelate above. Similar results were observed, also, when the above salts were added to a 65/35 propylene/pentene-1 copolymer or to a 70/30 propylene/octene-1 copolymer.

Example 22

A 2-kg. sample of poly-4-methylpentene-1 powder having a melting point of 240° C. (by differential thermal analysis) and an inherent viscosity of 1.5 in tetralin at 145° C. is dry blended with 20 g. of methylbenzylammonium sebacate. The resulting blend is melt extruded into a ¹⁄₁₆-in. rod and chopped into pellets and ³⁄₁₆ in. long. These pellets are fed to an extruder equipped with a single-hole jet and are melt spun into a continuous monofilament having substantially no spin draft. The monofilament is quenched in ice water during spinning and is subsequently drafted 12 to 1 over a hot roll at 115° C. The properties of this monofilament (I) at 80°

| Property | Units | Test Method | Poly(butene-1) Treated | Poly(butene-1) Untreated |
|---|---|---|---|---|
| Hardness, Shore D | | D Durometer | 68 | 63 |
| Tensile yield strength | P.s.i. | ASTM-D638 | 11,000 | 9,900 |
| Stiffness | P.s.i. | ASTM-D747 | 123,000 | 107,000 |
| Heat distortion temp. | ° C. | | 125 | 120 |

Comparable results are obtained when the piperidinium suberate is replaced with either pyridinium succinate or cyclohexylammonium methylsuccinate.

C. are shown in the table given below and are compared with a similar poly-4-methylpentene-1 monofilament containing no methylbenzylammonium sebacate (II).

| Property | I | II |
|---|---|---|
| Denier | 34 | 20 |
| Tenacity, g./den | 1.45 | 0.7 |
| Elongation, percent | 50 | 57 |
| Elastic modulus, g./den | 15 | 7 |

Comparable results are obtained when either didecylammonium mesaconate or diethylammonium glutaconate is used in place of the methylbenzylammonium sebacate above.

Example 23

The procedure of Example 16 was followed except that a 2-period block copolymer of ethylene (15 wt. percent) and propylene (85 wt. percent) was used in place of the polypropylene. The transparency ($I_0°/I_1°$) of the block copolymer was increased from a value of 1.06 to 3.60 by the addition of the dibutylammonium succinate.

Example 24

Polypropylene (100 g.) having an inherent viscosity (in tetralin at 145° C.) of 1.8 and a conditioned density of 0.909 was blended in a Banbury mixer with 1.0 gram of a 1:1 hexamethylphosphoric triamide-p-t-butylbenzoic acid complex. A sample of the resulting homogeneous blend was compression molded into a sheet having a thickness of 60 mils. The transparency of the sheet was measured with a Brice-Phoenix photometer (resolution of 10 minutes). The measure of transparency was taken as the ratio of light transmitted at zero degrees with reference to the incident beam (monochromatic light at 546 mµ) to that transmitted at one degree, higher values of the intensity ratio indicating better transparency. In addition, a sample of the above blend was injection molded for physical properties determinations. The following table shows the outstanding clarity and physical properties possessed by the treated polypropylene (I) in comparison with a similar sample of untreated polypropylene (II) and a sample treated with a 1% concentration of sodium p-tert-butylbenzoate (III).

Example 25

A 200-g. sample of conventional high-pressure polyethylene having a density of 0.916 was blended in a Banbury mixer with 1 g. of 1:1 hexabutylphosphorous triamide-p-isopropylbenzoic acid complex. The resulting polyethylene was extruded at 360° F. into tubular film (0.9–1.1 mil) having improved transparency and a reduced tendency toward blocking as shown in the table below:

| Property | Units | Test Method | Polymer Treated | Polymer Untreated |
|---|---|---|---|---|
| Density | G./ml | ASTM-D1505 | 0.923 | 0.916 |
| Natural blocking, 23° C | Grams | | 22 | 39 |
| Haze | Percent | ASTM-D1003 | 3 | 11 |
| Gloss at 45° | Percent | | 82 | 55 |

Similar results were obtained when the N,N-dimethylacetamide-p-n-butylbenzoic acid or N,N-dimethylformamide-p-tert-butylbenzoic acid complex was used in place of the hexabutylphosphorous triamide-p-isopropylbenzoic acid complex.

Example 26

A 5000-g. sample of high-density (0.961) polyethylene having a melt index of 4 was blended in a Banbury mixer with 17 g. of 1:1 N-tert-butylbenzamide-p-tert-butylbenzoic acid complex and then re-extruded into a ⅛-in. pellets. The pellets were then injection molded into 4-in. flat discs. Similar discs were molded from the original high-density polyethylene which had been processed in the Banbury mixer and extruded, but without the complex. The discs were allowed to age for 48 hours and were then checked for warpage. Only 8% of the discs from the treated polyethylene were found to be warped compared to 88% for the untreated polyethylene. Similar results were obtained when N-benzylacetamide-p-isobutylbenzoic acid or N-methyl-N-phenylacetonedi-p-isopropylbenzoic acid complex was used in place of the N-tert-butylbenzamide-p-tert-butylbenzoic acid complex. Potassium and lithium o-toluates or p-tert-butylbenzoates when blended into the high-density polyethylene gave relatively poor dispersions and were relatively ineffective.

Example 27

A 1000-g. sample of isotactic polybutene-1 having a melt index of 2.3 (190° C.; 2.16 kg.) and a melting point

| Property | Units | Test Method | Polymer I | Polymer II | Polymer III |
|---|---|---|---|---|---|
| Transparency | | $I_0°/I_1°$ | 12.5 | 1.09 | 2.10 |
| Crystallization temp | °C | DTA | 140 | 124 | 145 |
| Heat distortion temp | °C | | 162 | 154 | 158 |
| Tensile yield | P.s.i | ASTM-D638 | 6,200 | 5,500 | 5,800 |
| Stiffness | P.s.i | ASTM-D747 | 197,000 | 165,000 | 175,000 |
| Hardness, Rockwell R-scale | | ASTM-D785 | 99 | 99 | 99 |
| Izod impact, notched, 23° C | ft.-lb./in. of notch | ASTM-256 | 1.0 | 0.7 | 0.6 |

Results similar to those in column I were obtained when a 5% concentration of tripiperidino-phosphine oxide p-isopropylbenzoic acid complex or hexabutylphosphoric triamide-p-toluic acid complex was used in place of the hexamethylphosphoric triamide-p-tert-butylbenzoic complex. All attempts to prepare a completely homogeneous blend of polypropylene with the prior art sodium p-tert-butylbenzoate were unsuccessful. Particles of the nucleating agent were usually visible to the eye, and could readily be seen with the microscope and detected by X-ray. The crystallization promoters of this invention gave homogeneous blends and were not detectable by X-rays when dispersed in the polypropylene.

of 122° C. (by DTA) was blended in a Banbury mixer with 18 g. N,N'-dimethylurea-p-toluic acid complex. The resulting blend was cooled, granulated, and injection molded into specimens for physical properties tests. The results given in the table below show the great improvement in physical properties obtained in comparison with polybutene-1 containing no crystallization promoter.

| Property | Units | Test Method | Polybutene-1 Treated | Polybutene-1 Untreated |
|---|---|---|---|---|
| Hardness, Shore D | | D Durometer | 68 | 63 |
| Tensile yield strength | P.s.i | ASTM-D638 | 10,600 | 9,900 |
| Stiffness | P.s.i | ASTM-D747 | 142,000 | 107,000 |
| Heat distortion temp | °C | | 127 | 120 |

Comparable results are obtained when the N,N'-dimethylurea complex is replaced with either N,N'-di-tert-butylurea-1-naphthoic acid or tripiperidenophosphine oxide-p-toluic acid complex.

Example 28

A 2-period block copolymer comprised of stereoregular sequences of propylene units (80 wt. percent and 1-butene units (20 wt. percent) was prepared by conventional techniques in which living stereoregular propylene polymer chains were prepared followed by removal of unreacted propylene, then the introduction of 1-butene and continued polymerization. The block polymer (500 g.) was blended in a Banbury mixer with hexaethylphosphoric triamide-p-isobutylbenzoic acid complex (0.5 g.) and then granulated. A sample of the treated block polymer was compression molded into a small (1.5 in.) disc having a thickness of 60 mils. The transparency ($I_0°/I_1°$) of the disc was 4.78 compared with a control value of 1.12 for the untreated block polymer. Similar results are obtained when a 0.25% concentration of either O,O-diethyl-N,N-dihexylphosphoramidate-2-naphthoic acid or O,O - diethyl-N,N-dibutylphosphoramidate-o-toluic acid complex is used in place of the hexaethylphosphoric triamide complex.

Example 29

A low-viscosity costereosymmetric copolymer comprising 55 wt. percent propylene and 45 wt. percent 1-butene and having an inherent viscosity of 0.35 was melt blended with O - butyl-N,N,N',N'-tetraoctylphosphorodiamidite-p-toluic acid complex to provide a 2.0% concentration of the latter. Films of both the treated and untreated low-viscosity copolymers were melt cast at 190° C. using a hot doctor blade followed by quenching in cold water. The treated film showed a delayed tack period of 20 seconds compared to a delayed tack period of 45 seconds for the untreated film. The treated low-viscosity copolymer was thus useful for curtain coating applications, while the long delayed tack of the untreated polymer was objectionable since coated objects tended to stick together in assembly line operations. Comparable results were obtained when hexaethylphosphorous triamide-p-t-butylbenzoic acid was used in place of the diamidate complex above. Similar results were observed, also, when the above salts were added to a 60/40 propylene/hexene-1 copolymer or to a 70/30 propylene-decene-1 copolymer.

Example 30

A 2-kg. sample of poly-4-methyl-1 pentene powder having a melting point of 240° C. (by differential thermal analysis) and an inherent viscosity of 1.5 in tetralin at 145° C. is dry blended with 20 g. of hexamethylphosphoric triamide-p-isobutylbenzoic acid complex. The resulting blend is melt extruded into a 1/16-in. rod and chopped into pellets about 3/16-in. long. These pellets are fed to an extruder equipped with a single-hole jet and are melt spun into a continuous monofilament having substantially no spin draft. The monofilament is quenched in ice water during spinning and is subsequently drafted 12 to 1 over a hot roll at 115° C. The properties of this monofilament (I) at 80° C. are shown in the table given below and are compared with a similar poly-4-methyl-pentene-1 monofilament containing no hexamethylphosphoric triamide/p-isobutylbenzoic acid complex (II).

| Property | I | II |
| --- | --- | --- |
| Denier | 23 | 20 |
| Tenacity, g./den | 1.89 | 0.7 |
| Elongation, percent | 42 | 57 |
| Elastic modulus, g./den | 20 | 7 |

Comparable results are obtained when the N-benzylacetamide-p-n-butylbenzoic acid complex is used in place of the hexamethylphosphoric triamide complex above.

Example 31

The procedure of Example 1 was followed except that a 2-period block copolymer of ethylene (17%) and propylene (83%) was used in place of the polypropylene. The transparency ($I_0°/I_1°$) of the block copolymer was increased from a value of 1.06 to 3.75 by the addition of the hexamethylphosphoric triamide-p-t-butylbenzoic acid complex. Similar results were obtained when N,N,-N',N'-tetramethylphenylphosphonic diamide-p-tert-butylbenzoic acid complex or the N,N-dibutyldiphenylphosphinic amide-p-isopropylbenzoic acid complex was used.

Example 32

This example demonstrates the importance of compatibility of the crystallization promoter with the poly-(α-olefin).

Polypropylene (100 g.) having an inherent viscosity (in tetralin at 145° C.) of 1.8 and a conditioned density of 0.909 was blended on the rolls of a rubber mill with 1.0 gram of p-azoxyanisole (a nematogenic compound showing a nematic mesaphase between 117° C. and 136° C.). The resulting blend was substantially non-homogeneous and a sheet compression molded from the blend was opaque. Differential thermal analysis showed that the p-azoxy-anisole had substantially no effect on the crystallization temperature of the polypropylene. The physical properties of the blend showed no improvements over the unmodified polypropylene.

The invention has been described in detail with particular reference to preferred embodiments thereof, but, it will be understood that variation and modification can be effected within the spirit and scope of the invention described hereinabove and in the appended claims.

We claim:

1. Crystallizable poly-alpha-olefinic material having dispersed therein at least one essentially metal free crystallization promoter which is compatible with said material and which exhibits a liquid crystalline state at a temperature at least below the melting point of said poly-alpha-olefinic material, and wherein said crystallinity promoter is selected from the group consisting of the non-metallic salts and complexes of organic carboxylic acids.

2. Partially crystalline poly-alpha-olefinic material having dispersed therein at least one essentially metal free crystallization promoter which is compatible with said material and which exhibits a liquid crystalline state at a temperature at least below the melting point of said poly-alpha-olefinic material, and wherein said crystallinity promoter is selected from the group consisting of the non-metallic salts and complexes of organic carboxylic acids.

3. Polypropylene having dispersed therein at least one essentially metal free crystallization promoter which is compatible with said material and which exhibits a liquid crystalline state at a temperature at least below the melting point of said poly-alpha-olefinic material, said polymer having an $I_0°/I_1°$ transparency value of greater than about 2.0, and wherein said crystallinity promoter is selected from the group consisting of the non-metallic salts and complexes of organic carboxylic acids.

4. A copolymer of propylene and 1-butene having dispersed therein at least one essentially metal free crystallization promoter which is compatible with said material and which exhibits a liquid crystalline state at a temperature at least below the melting point of said poly-alpha-olefinic material, said polymer having an $I_0°/I_1°$ transparency value of greater than about 2.0, and wherein said crystallinity promoter is selected from the group consisting of the non-metallic salts and complexes of organic carboxylic acids.

5. Polyethylene having dispersed therein at least one essentially metal free crystallization promoter which is compatible with said material and which exhibits a liquid crystalline state at a temperature at least below the melting point of said poly-alpha-olefinic material, said polymer being further characterized by a natural blocking at 23° C. of less than about 38 grams, a haze of less than about 10% and a gloss at 45° of greater than about 60%, and wherein said crystallinity promoter is selected from the group consisting of the non-metallic salts and complexes of organic carboxylic acids.

6. Polybutene-1 having dispersed therein at least one essentially metal free crystallization promoter which is compatible with said material and which exhibits a liquid crystalline state at a temperature at least below the melting point of said poly-alpha-olefinic material, said polymer being further characterized by a Shore D hardness of greater than about 64, a stiffness of greater than about 110 p.s.i., and a heat distortion temperature of greater than about 121° C., and wherein said crystallinity promoter is selected from the group consisting of the non-metallic salts and complexes of organic carboxylic acids.

7. Poly-4-methyl-1-pentene having dispersed therein at least one essentially metal free crystallization promoter which is compatible with said material and which exhibits a liquid crystalline state at a temperature at least below the melting point of said poly-alpha-olefinic material, said polymer being further characterized by being formable into monofilaments having a tenacity of greater than about 1.0 g./den., and an elastic modulus of greater than about 8, and wherein said crystallinity promoter is selected from the group consisting of the non-metallic salts and complexes of organic carboxylic acids.

8. A copolymer of propylene and ethylene having dispersed therein at least one essentially metal free crystallization promoter which is compatible with said material and which exhibits a liquid crystalline state at a temperature at least below the melting point of said poly-alpha-olefinic material, said polymer having an $I_0°/I_1°$ transparency value of greater than about 2.0, and wherein said crystallinity promoter is selected from the group consisting of the non-metallic salts and complexes of organic carboxylic acids.

9. Crystallizable poly-α-olefinic material having dispersed therein an essentially metal free crystallization promoter which is compatible with said material and which exhibits a liquid crystalline state at a temperature at least below the melting point of said poly-α-olefinic material, said promoter being selected from the group consisting of those of the formula $[R—COO]^-[Amine·H]^+$, wherein R is an alkyl substituted phenyl radical and $[Amine·H]^+$ is derived from an amine selected from the group consisting of

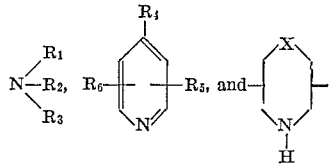

wherein at least one of $R_1$, $R_2$, and $R_3$ is selected from the group consisting of aliphatic hydrocarbon radicals of from 1 to 20 carbon atoms, alicyclic hydrocarbon radicals of from 5 to 6 ring carbon atoms, and aromatic hydrocarbon radicals, wherein $R_4$, $R_5$, and $R_6$ are selected from the group consisting of hydrogen and aliphatic hydrocarbon radicals of from 1 to 4 carbon atoms, and X is selected from the group consisting of —CH$_2$—, —NH—, —O— and —S—.

10. Partially crystalline poly-α-olefinic material having dispersed therein an essentially metal free crystallization promoter which is compatible with said material and which exhibits a liquid crystalline state at a temperature at least below the melting point of said poly-α-olefinic material, said promoter being selected from the group consisting of those of the formula $$[R—COO]^-[Amine·H]^+$$

wherein R is an alkyl substituted phenyl radical and $[Amine.H]^+$ is derived from an amine selected from the group consisting of

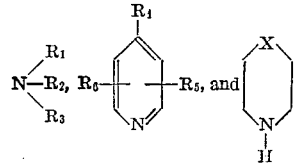

wherein at least one of $R_1$, $R_2$, and $R_3$ is selected from the group consisting of aliphatic hydrocarbon radicals of from 1 to 20 carbon atoms, alicyclic hydrocarbon radicals of from 5 to 6 ring carbon atoms, and aromatic hydrocarbon radicals, wherein $R_4$, $R_5$, and $R_6$ are selected from the group consisting of hydrogen and aliphatic hydrocarbon radicals of from 1 to 4 carbon atoms, and X is selected from the group consisting of —CH$_2$—, —NH—, —O— and —S—.

11. Crystallizable poly-alpha-olefinic material having dispersed therein from about 0.1 to about 5.0% by weight of at least one essentially metal free crystallization promoter which is compatible with said material and which exhibits a liquid crystalline state at a temperature at least below the melting point of said poly-alpha-olefinic material, and wherein said crystallinity promoter is selected from the group consisting of the non-metallic salts and complexes of organic carboxylic acids.

12. The process of promoting crystallization of poly-alpha-olefins comprising cooling a melt of the crystalline polymer, at least to its partially crystalline state, in the presence of an essentially metal free crystallization promoter which is compatible with said polyolefins and which exhibits a liquid crystalline state at a temperature at least below the melting point of said poly-alpha-olefinic material and which is homogeneously dispersed therein, and wherein said crystallization promoter is selected from the group consisting of the non-metallic salts and complexes of organic carboxylic acids or the mono- and di-N-substituted ammonium salts of aromatic sulfonic acids.

13. A crystallizable poly-alpha-olefinic material having dispersed therein at least one essentially metal free crystallization promoter which is compatible with said material and which exhibits a liquid crystalline state at a temperature at least below the melting point of said poly-alpha olefinic material, wherein said crystallization promoter is selected from the group consisting of the mono- and di-N-substituted ammonium salts of aromatic sulfonic acids, the N-substituted ammonium salts of aromatic carboxylic acids, the N-substituted ammonium half-salts of dibasic carboxylic acids and the amide complexes of organic carboxylic acids.

14. A crystallizable poly-alpha-olefinic material in accordance with claim 13 wherein said crystallinity promoter comprises at least one mono- or di-N-substituted ammonium salt of an aromatic sulfonic acid.

15. A crystallizable poly-alpha-olefinic material in accordance with claim 13 wherein said crystallinity promoter comprises at least one N-substituted ammonium salt of an aromatic carboxylic acid.

16. A crystallizable poly-alpha-olefinic material in accordance with claim 13 wherein said crystallinity promoter comprises at least one N-substituted ammonium half-salt of a dibasic carboxylic acid.

17. A crystallizable poly-alpha-olefinic material in accordance with claim 13 wherein said crystallinity promoter comprises at least one amide complex of an organic carboxylic acid.

References Cited

UNITED STATES PATENTS

| | | | |
|---|---|---|---|
| 3,207,735 | 9/1965 | Wijga | 260—93.7 |
| 3,207,738 | 9/1965 | Wÿga | 260—94.9 |

FOREIGN PATENTS

| | | |
|---|---|---|
| 893,604 | 4/1962 | Great Britain. |
| 902,587 | 8/1962 | Great Britain. |
| 987,421 | 3/1965 | Great Britain. |

JOSEPH L. SCHOFER, *Primary Examiner.*

L. EDELMAN, *Assistant Examiner.*

UNITED STATES PATENT OFFICE
CERTIFICATE OF CORRECTION

Patent No. 3,408,341                            October 29, 1968

Frederick B. Joyner et al.

It is certified that error appears in the above identified patent and that said Letters Patent are hereby corrected as shown below:

Column 19, lines 40 to 47, the formula should appear as shown below:

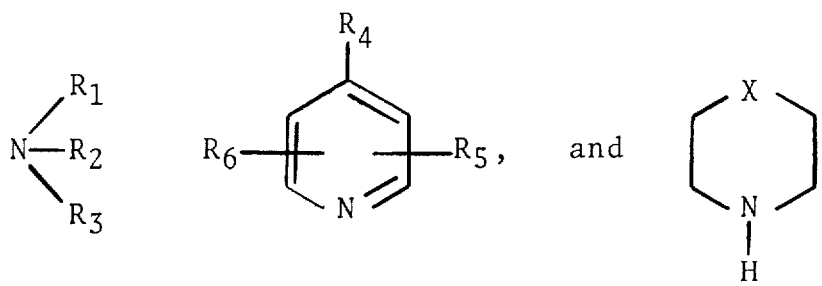

Signed and sealed this 10th day of March 1970.

(SEAL)
Attest:

EDWARD M. FLETCHER, JR.                  WILLIAM E. SCHUYLER, JR.
Attesting Officer                            Commissioner of Patents